US012275216B2

(12) United States Patent
Ter Schiphorst et al.

(10) Patent No.: US 12,275,216 B2
(45) Date of Patent: Apr. 15, 2025

(54) AUTOMOBILE LIGHTING

(71) Applicant: CLEARVUE EUROPE HOLDING B.V., Amsterdam (NL)

(72) Inventors: Jeroen Ter Schiphorst, Amsterdam (NL); Raghu Kishore Pendyala, Amsterdam (NL); Teunis Jort Lowijs Wagenaar, Amsterdam (NL)

(73) Assignee: CLEARVALUE EUROPE HOLDING B.V., Amsterdam (NL)

( * ) Notice: Subject to any disclaimer, the term of this patent is extended or adjusted under 35 U.S.C. 154(b) by 0 days.

(21) Appl. No.: 18/546,023

(22) PCT Filed: Feb. 9, 2022

(86) PCT No.: PCT/EP2022/053139
§ 371 (c)(1),
(2) Date: Aug. 10, 2023

(87) PCT Pub. No.: WO2022/171678
PCT Pub. Date: Aug. 18, 2022

(65) Prior Publication Data
US 2024/0100808 A1    Mar. 28, 2024

(30) Foreign Application Priority Data

Feb. 10, 2021    (LU) ...................................... 102499

(51) Int. Cl.
*B32B 17/10*    (2006.01)
*F21S 43/14*    (2018.01)
(Continued)

(52) U.S. Cl.
CPC .. *B32B 17/10036* (2013.01); *B32B 17/10284* (2013.01); *B32B 17/10541* (2013.01);
(Continued)

(58) Field of Classification Search
CPC ........ B32B 17/10036; B32B 17/10284; B32B 17/10541; B32B 17/10699;
(Continued)

(56) References Cited

U.S. PATENT DOCUMENTS 9,994,144 B2    6/2018  Dellock
2009/0103853 A1    4/2009  Daniel
(Continued)

FOREIGN PATENT DOCUMENTS

DE    102014015695    4/2016
FR    2914070    9/2008
(Continued)

OTHER PUBLICATIONS

International Search Report and Written Opinion of the International Searching Authority for PCT/EP2022/053139, May 16, 2022, 14 pages.

*Primary Examiner* — Thomas M Sember
(74) *Attorney, Agent, or Firm* — Heslin Rothenberg Farley & Mesiti P.C.; Jacquelyn A. Graff, Esq.

(57) ABSTRACT

The present invention proposes an optical device according to claim 1. The optical device comprises a glazing with a top outer surface and a bottom outer surface extending between a first lateral end face and a second lateral end face. The glazing comprises at least one outer layer made of glass or of an optically clear polymer material. The glazing comprises a photoluminescent structure having one or more photoluminescent domains. The optical device comprises a light source for injecting excitation light into said glazing, said excitation light being suitable to excite the one or more photoluminescent domains to induce photoluminescence of the one or more photoluminescent domains. The light source is optically coupled to the glazing to inject light such that the light injected at the first lateral end face of the glazing so that the light is guided to propagate through the glazing from the (Continued)

first lateral end face to the second lateral end face, the glazing forming a waveguide between the top surface and the bottom surface by total internal reflection of the light at the top outer surface and the bottom outer surface, to induce photoluminescence of the one or more photoluminescent domains.

20 Claims, 3 Drawing Sheets

(51) Int. Cl.
*F21S 43/249* (2018.01)
*F21V 8/00* (2006.01)
*F21V 9/38* (2018.01)
*G02B 1/04* (2006.01)

(52) U.S. Cl.
CPC .. *B32B 17/10669* (2013.01); *B32B 17/10743* (2013.01); *B32B 17/10761* (2013.01); *B32B 17/1077* (2013.01); *B32B 17/10779* (2013.01); *B32B 17/10788* (2013.01); *F21S 43/14* (2018.01); *F21S 43/249* (2018.01); *F21V 9/38* (2018.02); *G02B 1/04* (2013.01); *G02B 6/0043* (2013.01)

(58) Field of Classification Search
CPC ........ B32B 17/10743; B32B 17/10761; B32B 17/1077; B32B 17/10779; B32B 17/10788; F21S 43/249; F21S 43/14; F21V 9/38; G02B 1/04; G02B 6/0043
See application file for complete search history.

(56) References Cited

U.S. PATENT DOCUMENTS

| | | |
|---|---|---|
| 2009/0278448 A1 | 11/2009 | Tchakarov |
| 2013/0299856 A1* | 11/2013 | Verger ................... B60Q 3/208 438/27 |
| 2015/0253486 A1 | 9/2015 | Verger |
| 2017/0160454 A1 | 6/2017 | Tissot |
| 2017/0334342 A1 | 11/2017 | Dellock et al. |
| 2019/0137679 A1 | 5/2019 | Kroeger |

FOREIGN PATENT DOCUMENTS

| | | |
|---|---|---|
| FR | 3043025 | 5/2017 |
| WO | 2019042955 | 3/2019 |

* cited by examiner

AUTOMOBILE LIGHTING

CROSS REFERENCE TO RELATED APPLICATIONS

This application is a national stage filing under section 371 of International Application No. PCT/EP2022/053139, filed on Feb. 9, 2022, and published on Aug. 18, 2022 as WO 2022/171678, which claims priority to Luxembourg Patent Application No. LU102499, filed on Feb. 10, 2021. The entire contents of each application are incorporated herein by reference in their entireties.

TECHNICAL FIELD

The present disclosure relates to an optical device, in particular to glowing optical device.

BACKGROUND OF THE INVENTION

Fluorescence is the emission of light by a substance that has absorbed light or other electromagnetic radiation. For example, the absorbed radiation may lie in the ultraviolet region of the spectrum, and thus invisible to the human eye, while the emitted light is in the visible region, which gives the fluorescent substance a distinct color that can be seen only when exposed to UV light. Fluorescent materials cease to glow nearly immediately when the radiation source stops, whereas phosphorescent materials continue to emit light for some time after.

The emission of luminescent light by a particular luminescence material, i.e. a photoluminescence material, depends on the wavelength of electromagnetic radiation, i.e. the wavelength of light incident upon the respective luminescence material. By constructing a pattern of luminescent domains of luminescence material that emit visible luminescent light representing different images upon excitation by light of a particular wavelength, or a particular range of wavelengths, different images may be displayed by selectively illuminating the respective domains corresponding to a particular image by controlling the wavelength or wavelengths of the light emitted by the light source. Hence, different images can be displayed from a pattern of luminescent domains by a proper selection of the composition of the light emitted by the light source.

Document US 2017/0334342 teaches a windscreen glass provided with a phosphorescent layer to create an image and have this image glow. Document US 2019/0137679 teaches a laminated lighting unit in form of a functional layer comprising laminated layers between glass or polymers. One or more light sources are arranged at an edge of the lighting unit, in a way that the radiation is parallel to the laminated layer. Document US 2009/278448 teaches a luminous panel a luminous panel with illuminating elements via light extraction, either by structural light outcoupling, by means of optical structures, or luminescent domain.

It is an object of the present invention to propose an optical device which is robust.

SUMMARY OF THE INVENTION

The present invention proposes an optical device according to claim 1. The optical device comprises a glazing with a top outer surface and a bottom outer surface extending between a first lateral end face and a second lateral end face. The glazing comprises at least one outer layer made of glass or of an optically clear polymer material. The glazing comprises a photoluminescent structure having one or more photoluminescent domains. The optical device comprises a light source for injecting excitation light into said glazing, said excitation light being suitable to excite the one or more photoluminescent domains to induce photoluminescence of the one or more photoluminescent domains. The light source is optically coupled to the glazing to inject light such that the light injected at the first lateral end face of the glazing so that the light is guided to propagate through the glazing from the first lateral end face to the second lateral end face, the glazing forming a waveguide between the top surface and the bottom surface by total internal reflection of the light at the top outer surface and the bottom outer surface, to induce photoluminescence of the one or more photoluminescent domains.

With other words, the present invention proposes using the diffraction at the interface between the outer layer made of glass or of an optically clear polymer material, having a refractive index superior at the refractive index of the ambient air, to cause the internal reflection of the light into the glazing. The light is trapped into the glazing and can propagate from the first end face to the second end face. By total internal reflection, the skilled person understands that the most of light inside the glazing and incident on the outer surface/interface bounces on said surface and is reflected back. By total internal reflection, at least 60% preferably at least 80% of the light is reflected back and trapped into the glazing remains inside the glazing by diffraction of the light at the outer layer interface.

This allows the propagation of activation light into the glazing; to activate the fluorescent material therein. In contrast to prior art devices in which the light is simply injected into the device, the present teachings propose injecting the light inside the glazing in order to use diffraction at the interface. This means that the light is not just simply injected parallel at an edge of the glazing, but that light is coupled inside the glazing to achieve the required incident angles resulting in the light diffraction inside the glazing. This, in turn, allows improving the efficiency of the device.

The fluorescent material is printed and makes a layer of fluorescent material.

The present invention proposes using the entire glazing or laminated glass as a waveguide, which allows the light to reach the dye and ink layer more efficiently required to glow. It is more efficient than using a single inner layer of glass as a waveguide, in which case hardly any light reaches the dye layer, as this is in a layer deeper than the first glass.

In one embodiment, the light has an incident angle with the top outer surface or the bottom outer surface below 80°, preferably in the range of 42 and 80 degrees, with the at least one outer layer having an index of refraction comprises between 1.48 to 1.60. Preferably, the incident angle remains below 80°, preferably in the range of 42 and 80 degrees, during propagation throughout the glazing from the first lateral end face to the second lateral end face. With these angles of incident provides for the waveguiding of the light, through the glazing, from the first end face to the second end face.

The light source comprises a plurality of light-emitting diode (LED), preferably oriented at an angle in the range of 70 to 80°, with respect to the lateral end face surface. The first lateral end face has a polished edge with an angle of 30 to 50°. Orientating the light source with respect to the first lateral end face and/or polishing the edge receiving the light also provides for the waveguiding of the light inside the glazing.

Illuminating the glazing under specific angles, and not just parallel to the glazing, improves the waveguiding of the light inside the glazing for inducing photoluminescence of the one or more photoluminescent domains arranged inside the glazing. This results in an improved performance of the device.

In one aspect, the light source can be mounted on an adapter whose orientation can be varied to modify the orientation of the LED with respect to the glazing and change the orientation of the light injected at the lateral input end face.

It should be noted that the light can be injected at one edge or the other edge of the first lateral end face, and be injected such as the light first travels towards the outside of the glazing or towards the inside of the glazing.

In another aspect, the light source is placed on a top or on a bottom surface of the glazing, and an optical coupling structure is adapted to inject the light at the first end face, for example the optical coupling structure comprises a slanted glass slide.

A controller can be provided to selectively switch on and off the light source, in particular wherein the controller is adapted to control the brightness of one or more of the plurality of LEDs., and/or the controller is adapted to selectively switch on and off one or more of the plurality of LEDs.

The one or more photoluminescent domain comprises at least one of a fluorescent ink having one or more organic dyes, and quantum dots, having one or more excitation wavelengths.

It should be noted that the present invention proposes using photoluminescence and most preferably fluorescence, and not scattering particles. Fluorescence can be controlled easily and provides for different glowing effects. Another benefit of fluorescence over scattering is that multi color prints become possible, where the scattering layer is the same color as the light source. In addition, the structure remains transparent.

In particular, the luminescent structure may comprise organic dyes such a fluorescent ink, which can be printed in a known manner on the outside surface of the inner layer, and/or quantum dots, which may be quantum dots next to organic dyes. The luminescent structure may also comprise a plurality of inks, each activable at different excitation wavelengths.

In one aspect, the glazing comprises a stack made of first outer layer, a first inner layer, a central layer, a second inner layer and a second outer layer, wherein the outer layers are made of glass or of an optically clear polymer material and have an outer refractive index of comprised between 1.48 and 1.60, the inner layer are made of Polyvinyl butyral (PVB) or an equivalent material in particular with an inner refractive index of 1.48, and the central layer is made of Polyethylene Terephthalate (PET), in particular with a central refractive index of 1.6, and wherein the one or more photoluminescent domains are printed on the central layer.

Other equivalent materials to PVB may be for example materials provided for laminating glass, such as Ethylene-vinyl acetate (EVA) or Thermoplastic polyurethane (TPU) or Ionomer.

In another aspect, the glazing comprises a stack made of first outer layer, a first inner layer, a second optional inner layer and a second outer layer, wherein the outer layers are made of glass or an optically clear polymer material and have a refractive index comprised between 1.48 and 1.6, the first inner layer and the second optional inner layer are made of Polyvinyl butyral or equivalent material or are made of Polyethylene Terephthalate, wherein the photoluminescent domains are printed on the first inner layer.

In yet another aspect, a sticker is provided on the outer layer on glass via static or pressure sensitive adhesive, in particular wherein the sticker is made of Polyethylene Terephthalate.

In yet another aspect, the glazing comprises a stack made of first outer layer, a first inner layer, wherein the outer layer is made of made of glass or an optically clear polymer material and has a refractive index comprised between 1.48 and 1.60, the inner layer are made of PET, wherein the photoluminescent domains are printed on the outer surface of the inner layer.

The photoluminescent domains can be printed on the glass or optically clear polymer material. Printing directly on glass or other layers, we can also achieve illumination for further applications than simply automotive or the other fields.

Therefore, the present invention provides a laminated glass with printed fluorescent material or ink. Ink may be both visible and invisible, using organic and quantum dot based dyes.

In particular, the laminated glass can be illuminated at one end face to induce fluorescence of the ink and the glowing of the image printed on the glass using fluorescence. The waveguiding of the light between the first and second outer interfaces allows the dye layer to absorb more light or control homogeneous better, using angles to guide the light.

It will be appreciated that the domains of different luminescence material may be selected and arranged in groups to display different images and/or to display a same image in different colours, for example. The term image is to be construed in its most general form, including pictures, icons, diagrams, signs, pictograms but also textual content such as characters, figures, marks or any other type of graphics or information or content.

This provides a cheap and robust illuminating possibility.

The present invention further proposes an illumination panel comprising an optical device as described above.

The application is in automotive industries, for example by providing signage and facades, using end face illumination and waveguiding. A window panel as an illumination panel can be used in a facade of a building or separation wall, a signage device, and a screen intended to be used in a ship, plane or vehicle.

DETAILED DESCRIPTION

Additional features and advantages of the invention will be set forth in the detailed description which follows and will be apparent to those skilled in the art from the description or recognized by practicing the invention as described in the following description together with the claims and appended drawings.

Figure 1:
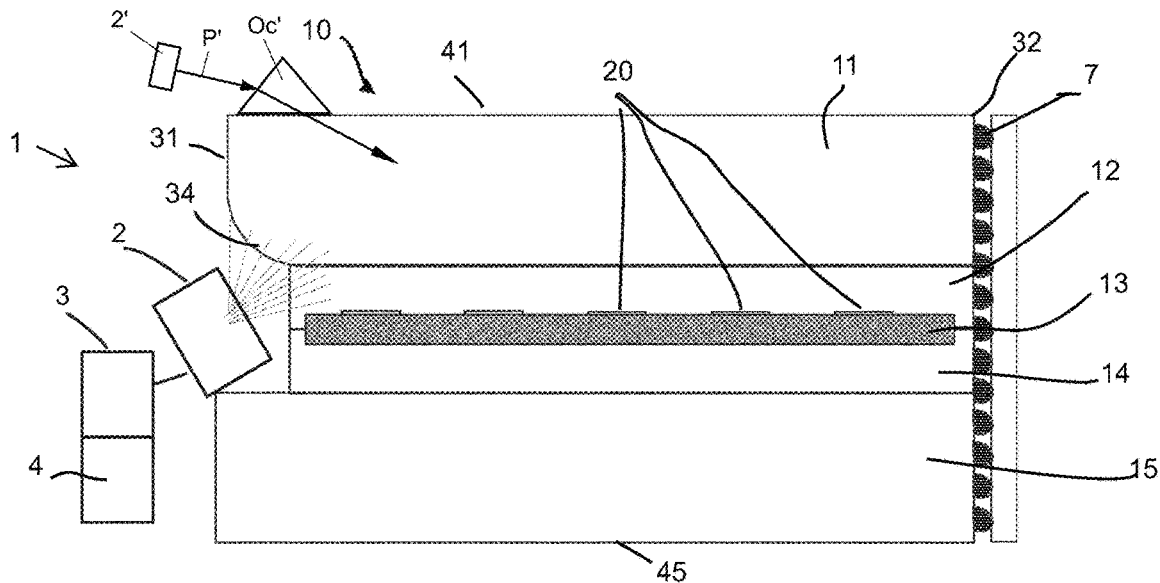
FIG. 1 shows an optical device according to a first embodiment of the present disclosure.
Figure 2:
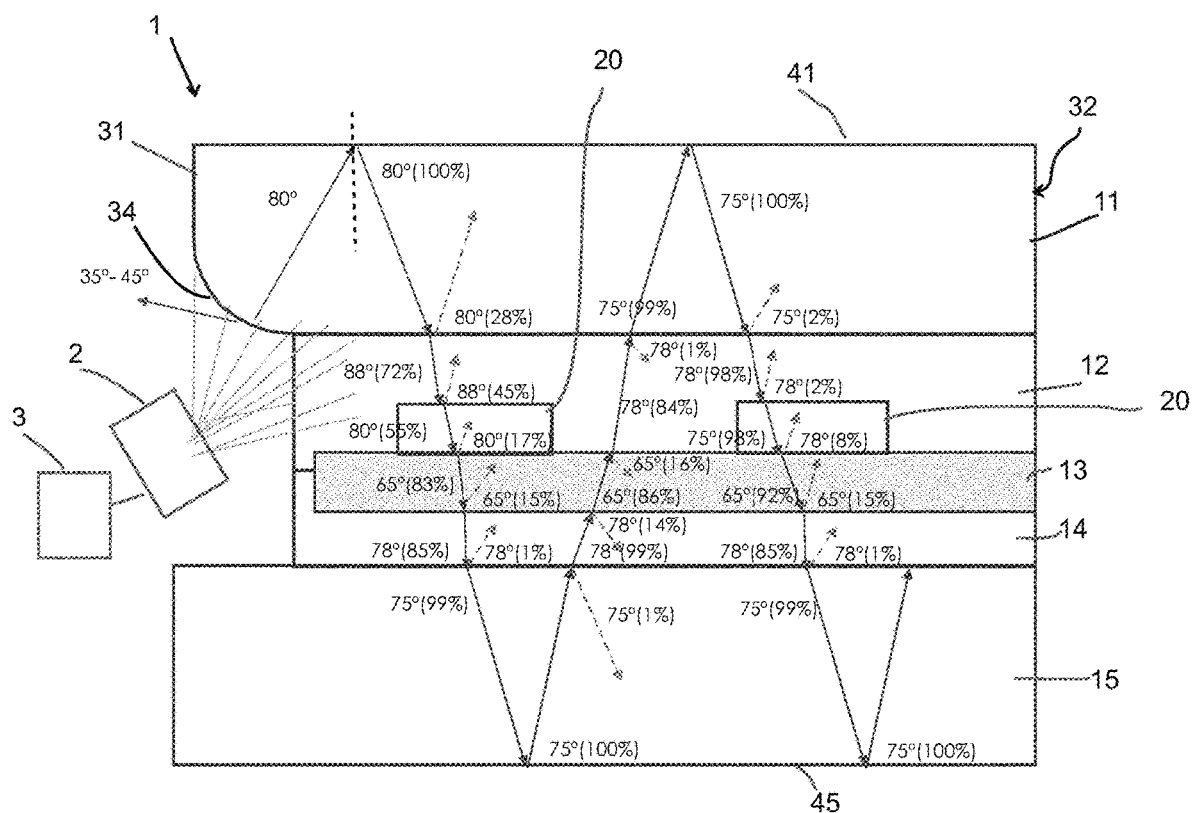
FIG. 2 shows an example of the light path in the optical device of FIG. 1 for a given example incident angle.

FIG. 1 shows an optical device 1 according to a first embodiment of the present disclosure and FIG. 2 shows an example of the light path in the optical device of FIG. 1.

The optical device 1 comprises a light source 2 optically coupled to a glazing 10 and arranged for emitting light into said glazing 10. The glazing 10 comprises a photoluminescent structure 20 whose luminescence can be excited by the light from the light source 2.

The wording optically coupled means that the light source can inject light into the glazing. The light source can be coupled via an optical structure, e.g. a tape, a glue, an optical fiber, or the light can be positioned with a small gap from the glass and the light from the light source is not absorbed on its pathway to the glazing. For example, the light source can be positioned at a about 0.5 mm away from glazing.

As will be understood from the following description, the present invention proposes injecting the excitation light at a lateral input end face 31 of the glazing 10 and uses the diffraction to guide the injected light through the glazing, from the lateral input end face 31 to a lateral exit end face 32, to induce luminescence of the photoluminescent structure 20 arranged between the lateral input end face 31 and the lateral exit end face 32.

In the first embodiment, the glazing 10 is a laminated glass comprising a stack made of first outer layer 11, a first inner layer 12, a central layer 13, a second inner layer 14 and a second outer layer 15. The first outer layer 11 has an outer surface corresponding to the top outer surface of the glazing. The second outer layer 15 has an outer surface corresponding to the bottom outer surface of the glazing.

The first and second outer layers are made of glass. The glass layers may be provided with a coating, such as anti-reflection coating or any other coating depending on requirements, such as heat insulation coating, sound insulation coating, with either higher or similar refractive index than the glass.

The first and second outer layer can be made of an optically clear polymer material, for instance Poly-methyl methacrylate, or any other optically clear polymer.

The first and second inner layers are made of plastic material typically used for laminating glass, such as polyvinyl butyral (PVB). PVB advantageously does not hinder the propagation of light but has a very high resistance to tearing. Its excellent adhesion to the glass makes it highly resistant to shocks. Other equivalent materials such as Ethylene-vinyl acetate (EVA) or Thermoplastic polyurethane (TPU) can also be used.

The central layer is made of PET.

The luminescent structure 20 is disposed on the central PET layer at the interface of one or both of the first and second inner layers 12, 14.

The luminescent structure 20 can comprise a plurality of luminescent domains.

The luminescent domains may comprise a first group of luminescent domains that comprise luminescence material arranged for emitting visible luminescent light upon excitation by light of a first wavelength and at least one further group of luminescent domains that comprise luminescence material arranged for emitting visible luminescent light upon excitation by light of at least one further wavelength.

The luminescent structure may comprise quantum dots and/or organic dyes such a fluorescent ink, which can be printed on the outside surface of the inner layer.

The ink can be deposited by at least one of inkjet printing, slot-die-coating, and screen printing.

The ink can consist of a mixture of acrylate containing monomers, the fluorescent dyes, photo-initiators and additives that allow polymerisation of the ink under atmospheric conditions. To achieve a printable thin luminescent layer the material preferably is fluidic while being applied on top of a substrate to be polymerized afterwards to form a thin film. By using an inkjet printing system that allows multiple inks to be printed simultaneously, different colours, gradients and combinations are possible. Using UV-curing inks allows the ink to be printed on a large variety of substrates and solidification of the ink during the inkjet printing process, hence increasing the production rate as in contrast to solvent inks, the solvent does not have to evaporate.

The luminescent structure may also comprise a plurality of inks, each activable at different excitation wavelengths, or having different thicknesses.

The skilled person understands that the ink may be chosen to be visible, invisible, unicolor, multicolour, depending on the applications. Any type of patterns can be considered.

The first outer layer 11 has a first outer layer refractive index superior to the refractive index of the ambient air, and defines a first outer interface 41 of the glazing at which diffraction can occur, and the second outer layer 15 has a second outer layer refractive index, defines a second outer interface 45 of the glazing at which diffraction can occur.

In the embodiment of FIG. 1, each of the outer layer is made of glass and a refractive index of comprised between 1.48 and 1.60. The inner layer are made of Polyvinyl butyral (PVB) and have a refractive index of 1.48, and the central layer is made of Polyethylene Terephthalate (PET), and has a refractive index of 1.6.

The ink is printed at the interface between the central layer and one of the inner layer.

In the example of FIG. 1, the outer layers have a thickness of 6 mm, and the inner layers has a thickness of 0.76 mm, and the central layer is made of Polyethylene Terephthalate (PET) of 0.05 mm. The thicknesses of the layers are given as a non-limiting example. The outer layers (glass or optically clear polymer material) may have a thickness comprised between 1 mm and 1.5 cm, and the inner layers (PVB) may have a thickness comprised between 0.05 mm and 1 mm, in particular 0.1, 0.38 or 0.76 mm, and the central layer (PET) a thickness comprised between 0,030 mm to 0,250 mm.

The luminescent structure is printed and can have a thickness of 5 to 50 micrometres, typically of 20 micrometres.

It should be noted that the luminescent structure is inkjet printed, multiple layers can be printed on top of each other, reaching the desired thickness and light absorbance.

In the first embodiment, the first and second outer layers are made of the same material. This is an example and different materials can be envisaged for the layer, for example one layer can be made of transparent glass whilst the other layer can be semi-transparent. In the same manner, the thickness of the first and second outer layers are the same in the example of FIG. 1, but it is possible to have different thicknesses for the layers. The first outer layer refractive index and the second outer layer refractive index may be different.

In the above mentioned, optical device of FIG. 1, as can be seen on FIG. 2, the light is injected at the input end face 31 of the glazing 10. The optical device 1 is designed such that a majority of light injected into the glazing remains inside the glazing using the diffraction at the first and second outer interfaces 41, between the ambient air and the outer layers. With other words, the optical device is designed such that the light injected by the light source into the glazing is guided through the glazing, by using the refraction properties at the first and second outer interfaces 41, 45 between the first and second outer layers of the glazing and the ambient air, to trap the light inside the glazing.

It is important to note that the light inside the glazing propagates through the different layers, and further experiences diffraction at each layer interfaces, due to the different indexes of the different layers. This means that the incident angles at the first and second outer 41, 45 interfaces between the glazing and the ambient air will change whilst the light propagates from the first input end face 31 to the second exit end face 32, due to the various reflections and refractions of the light during propagation.

To ensure that the light in the outer layers do not escape from the glazing but remains trapped inside the glazing, the light at the outer interfaces 41, 45 should be incident at an angle ensuring that the light is reflected back inside the outer layers, due to refraction, even after a number of reflections inside the glazing outer layer.

In order to do so, the light source 2 is arranged such that the input light is oriented with an input angle in the range of 42° to 80°, preferably below 80°, when the outer layers have a refractive index comprised between 1.48 to 1.60. The input end face of the glass has an edge 34 polished at an angle between 30° and 50°, preferably 40°. This orientation of the light source with the light at an angle between 70° and 80° helps at injecting most of the light in one of the first and second outer layer 11, 15, and at an incident angle adapted to get back most of the injected light into the glazing and makes the glazing a waveguide.

In FIG. 1, the light source 2 with the plurality of LED are provided laterally to the glazing 10, at the input end face 31. The skilled person understands that, in other embodiments, the light source 2 can be placed at different locations, such as on the top/bottom surface of the glazing, with an optical coupling structure adapted to inject the light at the first end face, for example the optical coupling structure comprises a slanted glass slide Oc' (placement shown in FIG. 1 being on the top surface of the glazing shown in FIG. 1, showing direction of light pathway P' emanating from alternate positioned light source 2').

FIG. 2 shows the light path in the glazing 10, in particular the percentage indicating the amount of light travelling between layers, and the angle at which the light is travelling in each media. The light path description of FIG. 2 is given with an initial input incident angle of 80°, taken as a non-limiting example. The light path description of FIG. 2 is given for a glazing in which the outer layer is made of glass and a refractive index of 1.5. The inner layer are made of Polyvinyl butyral (PVB) and have a refractive index of 1.48, and the central layer is made of Polyethylene Terephthalate (PET), and has a refractive index of 1.6.

In this example more of 80% of the light remains inside the glass due to the refraction at the interface between the outer layers made of glass and the ambient air.

It should be understood that the light source 2 can be optically coupled to the glazing such that the light is injected in one of the first or second outer layers, or both layers, from the lateral input end face 31, but it is also possible to inject the light directly towards the inner layers instead of the outer layers.

The light from the light source 2 or from the inner layers 12, 14 travels in the first or second outer layer 11, 15 made of glass and arrives at the first and second outer interfaces 41, 45 between the glass of the respective outer layer and the ambient air at an incident angle of max about 80° with respect to the surface, to refract light back into the respective outer layer. This helps maximizing the illuminating effect of the photoluminescent domains.

The light source 2 is provided to inject light in one or more excitation wavelength ranges which is suitable for activating the luminescent structure, in particular the fluorescent ink or quantum dots.

In particular, the light injected and guided into the glazing will be absorbed by the ink or quantum dots in said excitation wavelength range and will emit light again as a result of the fluorescence. The emitted light from the ink is preferably visible and this makes the glazing glow.

The light source 2 may comprise a plurality of LEDs or laser, controlled by a controller 4, to selectively switch on and off one or more of the LEDs, and possibly depending on their wavelengths. For example, the number of LED can be chosen depending on the required glow brightness.

Similarly, the light source can be mounted on a movable adapter 3, to adapt the orientation of the LED with respect to the glazing and change the orientation of the light injected at the input end face 31.

The optical device may further comprise an outcoupling structure 7, as illustrated at the lateral output end face 32. This structure can comprise micro-lens or any outcoupling structures to extract trapped light. Trapped light can comprise both the light injected and the emission radiation from the luminescent structure.

In addition, the optical device may further comprise a reflective side, to trap the light back again when no energy harvesting is desired.

Figure 3:
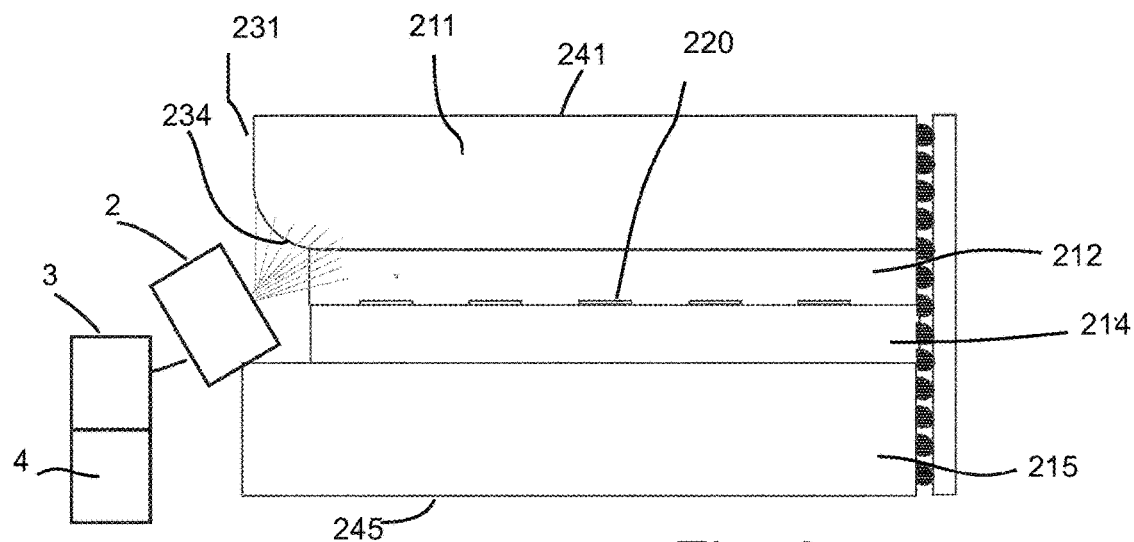
FIG. 3 shows an optical device according to a second embodiment of the present disclosure.
Figure 4:
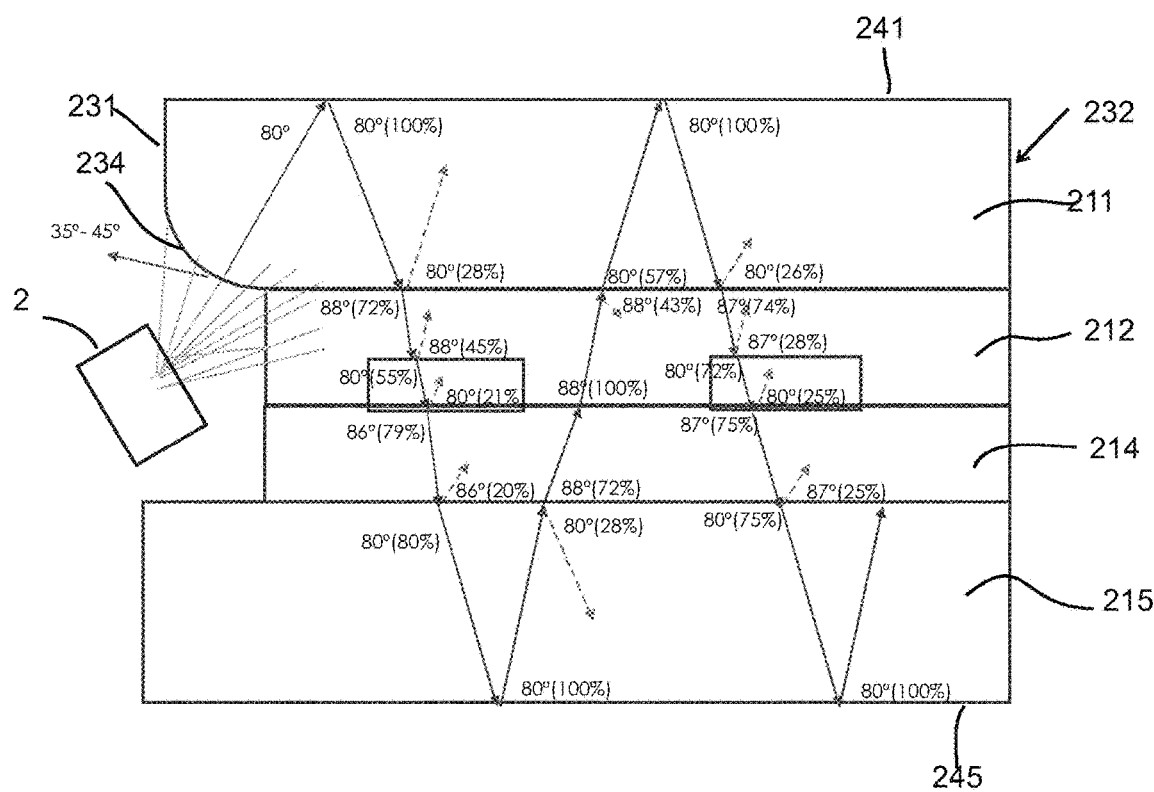
FIG. 4 shows an example of the light path in the optical device of FIG. 3 for a given example of incident angle.

FIG. 3 shows an optical device 200 according to a second embodiment of the present disclosure, and FIG. 4 shows an example of the light path in the optical device 200 of FIG. 3. The optical device 200 according to the second embodiment differs from the optical device 200 of first embodiment mainly by the glazing.

In the second embodiment, the glazing 210 is a laminated glass comprising a stack made of first outer layer 211, a first inner layer 212, a second inner layer 214 and a second outer layer 215. With other words, the central layer made of PET of the first embodiment is not present anymore in the glazing of the second embodiment.

The first outer layer 211 has an outer surface corresponding to the top outer surface of the glazing. The second outer layer 215 has an outer surface corresponding to the bottom outer surface of the glazing.

The outer layers 211, 215 have a thickness of 6 mm and a refractive index of comprised between 1.48 and 1.9, the inner layers 212, 214 are made of PVB.

In this embodiment, the inner layers 212, 214 have a reduced thickness of 0.38 mm, but this is a non limiting example.

It is possible to have only one inner layer 212 instead of two inner layers.

The luminescent structure 220 comprises fluorescent organic dyes and/or quantum dots, printed on one of the first and second inner layers 214, 215, at the interface between the two inner layer 214, 215.

In the above mentioned optical device of FIG. 3, and as seen on FIG. 4, the light has to travel in the glass at an angle of 80° to refract light at the coating interface and harvest maximum light towards the end face of the glass. The light path description of FIG. 3 is given for a glazing the outer layers 211, 215 have a refractive index of 1.5, the inner layers 212, 214 which are made of PVB have a refractive index of 1.48.

Figure 5:
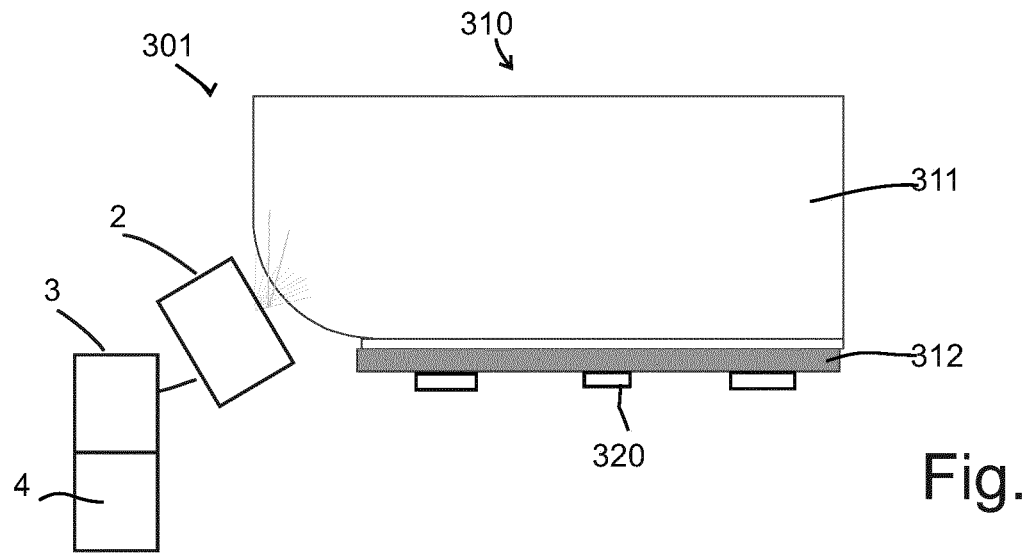
FIG. 5 shows an optical device according to a third embodiment of the present disclosure.
Figure 6:
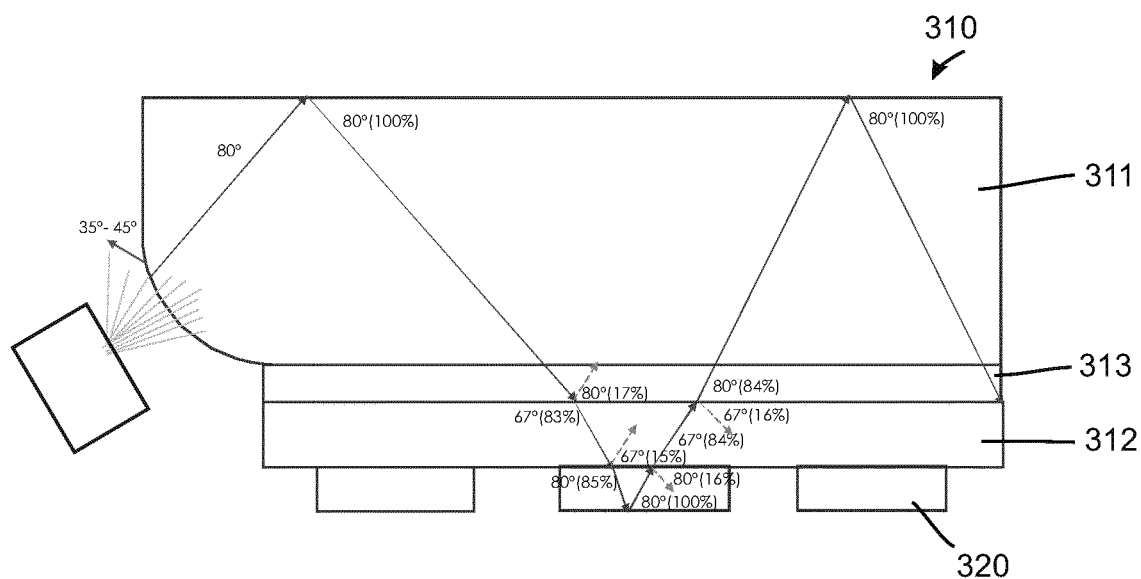
FIG. 6 shows an example of the light path in the optical device of FIG. 5 for a given example of incident angle.

FIG. 5 shows an optical device 310 according to a third embodiment of the present disclosure, and FIG. 6 shows an example of the light path in the optical device 310 of FIG. 5.

In the third embodiment, the glazing 310 of FIGS. 5 and 6 forms a stack made of an outer layer 311, an adhesive layer 313 and an inner layer 312.

The outer layer 311 is made of glass and a refractive index of 1.5. The inner layer 312 is a plastic layer, for example made of PET. The ink is printed on the outer surface of the inner layer. The outer layer 11 has a thickness of 12 mm, a first inner layer 12.

A sticker may provided on the glazing, such as a static or pressure sensitive adhesive. In FIG. 5 the inner layer 312 made of PET may be such a sticker. In this case, other refractive index materials can be used, such as PP, PE etc. Polyolefine.

It should be noted that the present invention proposes using fluorescence, and not scattering particles. Fluorescence can be controlled easily, and provides for different glowing effects. Another benefit of fluorescence over scattering is that multi color prints become possible, where the scattering layer is the same color as the LED. In addition, the structure remains transparent.

In particular, the luminescent structure may comprise organic dyes such a fluorescent ink, which can be printed in a known manner on the outside surface of the inner layer, and/or quantum dots, which may be quantum dots next to organic dyes. The luminescent structure may also comprise a plurality of inks, each activable at different excitation wavelengths.

The waveguiding of the light between the first and second outer interfaces defined by the top surface and the bottom surface allows the dye layer to absorb more light or control homogeneous better, using angles to guide the light.

It will be appreciated that the domains of different luminescence material may be selected and arranged in groups to display different images and/or to display a same image in different colours, for example. The term image is to be construed in its most general form, including pictures, icons, diagrams, signs, pictograms but also textual content such as characters, figures, marks or any other type of graphics or information or content.

The skilled person understands that the glazing can be used in a variety of applications, such as in the field of automotive, or in the field of signalisations, to make lighting panels, informative panels. Indeed; in a practical application the optical device may advantageously be applied as a component in a window panel for use in a facade of a building, as an illuminating surface or specific display. This renders the device suitable for both illumination/signage applications, wave guiding light from the end faces towards the luminescent material. It would be possible to combine the optical device with a collector and solar cells, for harvesting solar energy, capturing incident sunlight and re-emitting photons to the end faces where one or more photo-voltaic solar cells are attached.

Field of use of such devices may be in auto-motive, signage and building integrated photo-voltaics.

The invention claimed is:

1. An optical device comprising a glazing with a top outer surface and a bottom outer surface extending between a first lateral end face and a second lateral end face, the glazing comprising:

at least one outer layer made of glass or of an optically clear polymer material and the glazing comprising a photoluminescent structure having one or more photoluminescent domains, wherein the optical device comprises a light source for injecting excitation light into said glazing, said excitation light being suitable to excite the one or more photoluminescent domains to induce photoluminescence of the one or more photoluminescent domains, wherein the light source is optically coupled to the glazing to inject light at the first lateral end face of the glazing so that the light is guided to propagate through the glazing from the first lateral end face to the second lateral end face, the glazing forming a waveguide between the top surface and the bottom surface by total internal reflection of the light at the top outer surface and the bottom outer surface, to induce photoluminescence of the one or more photoluminescent domains, wherein the light source comprises a plurality of LED with respect to the lateral end face surface, and wherein the light source is mounted on an adapter whose orientation can be varied to modify the orientation of the LED with respect to the glazing and change the orientation of the light injected at the lateral input end face.

2. The optical device of claim 1, wherein the light has an incident angle with the top outer surface or the bottom outer surface below 80° with the at least one outer layer having an index of refraction comprises between 1.48 to 1.60.

3. The optical device of claim 2, wherein the incident angle remains below 80° during propagation throughout the glazing from the first lateral end face to the second lateral end face.

4. The optical device of claim 3, wherein the incident angle is in the range of 42° and 80°.

5. The optical device of claim 2, wherein the light has an incident angle with the top outer surface or the bottom outer surface in the range of 42° and 80° degrees.

6. The optical device of claim 1, wherein the first lateral end face has a polished edge with an angle of 30° to 50°.

7. The optical device claim 1, wherein the light source is placed on a top or on a bottom surface of the glazing, and an optical coupling structure is adapted to inject the light at the first end face.

8. The optical device of claim 7, wherein the optical coupling structure comprises a slanted glass slide.

9. The optical device of claim 1, comprising a controller to selectively switch on and off the light source, in particular wherein the controller is adapted to control the brightness of one or more of the plurality of LEDs, and/or the controller is adapted to selectively switch on and off one or more of the plurality of LEDs.

10. The optical device of claim 9, wherein the controller is adapted to control the brightness of one or more of the plurality of LEDs and/or the to selectively switch on and off one or more of the plurality of LEDs.

11. The optical device of claim 1, wherein the one or more photoluminescent domain comprises at least one of a fluorescent ink having one or more organic dyes, and quantum dots, having one or more excitation wavelengths.

12. The optical device of claim 1, wherein the glazing comprises a stack made of a first outer layer, a first inner layer, a central layer, a second inner layer and a second outer layer, wherein the outer layers are made of glass or of an optically clear polymer material and have an outer refractive index of comprised between 1.48 and 1.60, the inner layers are made of Polyvinyl butyral (PVB) or an equivalent material in particular with an inner refractive index of 1,48, and the central layer is made of Polyethylene Terephthalate (PET), in particular with a central refractive index of 1,6, and wherein the one or more photoluminescent domains are printed on the central layer.

13. The optical device of claim 1, wherein the glazing comprises a stack made of a first outer layer, a first inner layer, a second optional inner layer and a second outer layer, wherein the outer layers are made of glass or an optically clear polymer material and have a refractive index comprised between 1,48 and 1,6, the first inner layer and the second optional inner layer are made of Polyvinyl butyral or equivalent material or are made of Polyethylene Terephthalate, wherein the photoluminescent domains are printed on the first inner layer.

14. The optical device claim 1, wherein a sticker is provided on the outer layer on glass via static or pressure sensitive adhesive, in particular wherein the sticker is made of Polyethylene Terephthalate.

15. The optical device of claim 1, wherein the glazing comprises a stack made of a first outer layer, a first inner layer, wherein the outer layer is made of made of glass or an optically clear polymer material and has a refractive index comprised between 1,48 and 1,60, the inner layer are made of PET, wherein the photoluminescent domains are printed on the outer surface of the inner layer.

16. The optical device of claim 1, wherein the photoluminescent domains are printed on the glass or optically clear polymer material.

17. Illumination panel comprising an optical device of claim 1.

18. The optical device of claim 1, wherein the plurality of LED are oriented at an angle in the range of 70° to 80° with respect to the lateral end surface.

19. An optical device comprising a glazing with a top outer surface and a bottom outer surface extending between a first lateral end face and a second lateral end face, the glazing comprising:
   at least one outer layer made of glass or of an optically clear polymer material and the glazing comprising a photoluminescent structure having one or more photoluminescent domains,
   wherein the optical device comprises a light source for injecting excitation light into said glazing, said excitation light being suitable to excite the one or more photoluminescent domains to induce photoluminescence of the one or more photoluminescent domains,
   wherein the light source is optically coupled to the glazing to inject light at the first lateral end face of the glazing so that the light is guided to propagate through the glazing from the first lateral end face to the second lateral end face, the glazing forming a waveguide between the top surface and the bottom surface by total internal reflection of the light at the top outer surface and the bottom outer surface, to induce photoluminescence of the one or more photoluminescent domains,
   wherein a sticker is provided on the outer layer on glass via static or pressure sensitive adhesive, in particular wherein the sticker is made of Polyethylene Terephthalate.

20. An optical device comprising a glazing with a top outer surface and a bottom outer surface extending between a first lateral end face and a second lateral end face, the glazing comprising:
   at least one outer layer made of glass or of an optically clear polymer material and the glazing comprising a photoluminescent structure having one or more photoluminescent domains,
   wherein the optical device comprises a light source for injecting excitation light into said glazing, said excitation light being suitable to excite the one or more photoluminescent domains to induce photoluminescence of the one or more photoluminescent domains,
   wherein the light source is optically coupled to the glazing to inject light at the first lateral end face of the glazing so that the light is guided to propagate through the glazing from the first lateral end face to the second lateral end face, the glazing forming a waveguide between the top surface and the bottom surface by total internal reflection of the light at the top outer surface and the bottom outer surface, to induce photoluminescence of the one or more photoluminescent domains,
   wherein the light source comprises a plurality of LED with respect to the lateral end face surface, and
   wherein the plurality of LED are oriented at an angle in the range of 70° to 80° with respect to the lateral end surface.

* * * * *